(No Model.)

J. F. KELLY & W. STANLEY, Jr.
ELECTRO MAGNETIC MOTOR.

No. 479,746. Patented July 26, 1892.

Witnesses:
Raphaël Netter
M. G. Tracy.

Inventors
William Stanley Jr
and John F. Kelly
by Duncan Page
Attorneys.

UNITED STATES PATENT OFFICE.

JOHN F. KELLY, OF NEW YORK, N. Y., AND WILLIAM STANLEY, JR., OF PITTSFIELD, MASSACHUSETTS.

ELECTRO-MAGNETIC MOTOR.

SPECIFICATION forming part of Letters Patent No. 479,746, dated July 26, 1892.

Application filed May 29, 1891. Renewed March 5, 1892. Serial No. 423,934. (No model.)

*To all whom it may concern:*

Be it known that we, JOHN F. KELLY, residing at New York, in the county and State of New York, and WILLIAM STANLEY, Jr., residing at Pittsfield, in the county of Berkshire and State of Massachusetts, citizens of the United States, have invented certain new and useful Improvements in Electro-Magnetic Motors, of which the following is a specification, reference being had to the drawings accompanying and forming a part of the same.

It is a well-known fact that an ordinary electro-magnetic motor may be operated by an alternating current, but far less efficiently, for various reasons, than by a continuous current. To better adapt such motors to the peculiar conditions required by alternating currents, various changes have been made or proposed. The chief of these is to laminate or subdivide the cores of the field as well as the armature. To correct a very serious obstacle to the efficient working of such motors when the field and armature circuits are in derivation to the source of alternating currents, we have placed in the circuit of the field a condenser to neutralize the effect of self-induction and bring the phases in the armature and field circuits more nearly in accord.

Our present application has to do with series as well as shunt wound motors, in fact with any motor in which the electro-motive force in the field and armature circuits or coils is directly and not inductively impressed by the generator. It is a common characteristic of all such motors that the lag or retardation of the current behind the impressed electro-motive force caused by the self-induction of the motor reduces their efficiency to a comparatively low point. This defect in the working of such motors we seek to overcome by inserting into the line in series with the motor a condenser of proper value to neutralize the electro-motive force of the self-induction.

This invention applies more particularly to series motors, for in shunt-wound motors, where the self-induction is mainly in the field-circuit, we may simply include the condenser in the field-circuit only.

We have illustrated the invention in the accompanying drawings.

Figure 1:
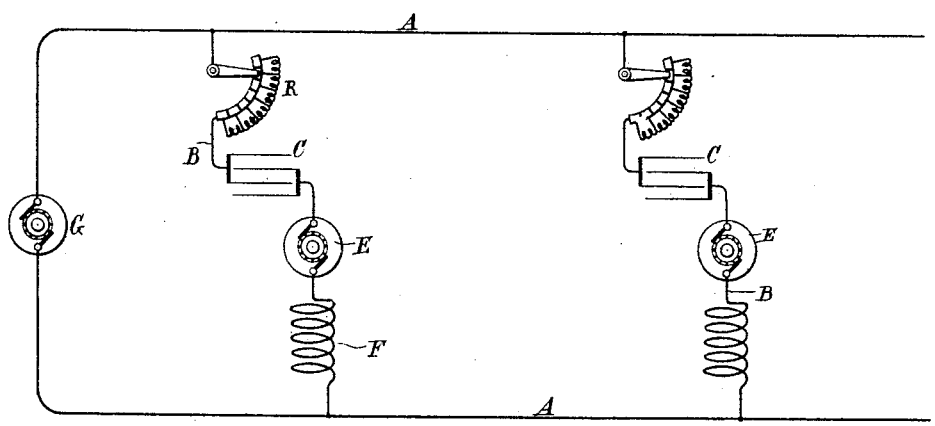
Figure 2:
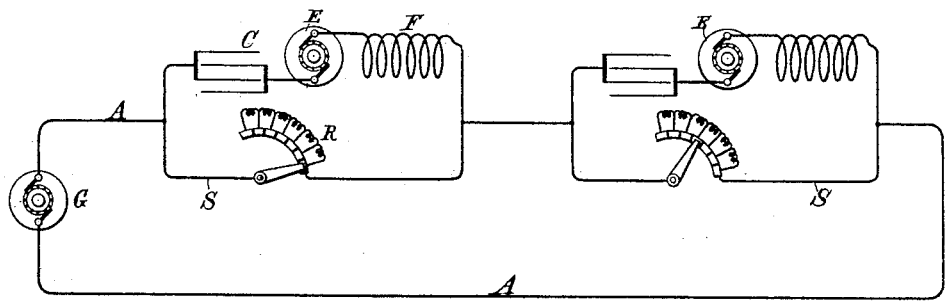

Figure 1 is a diagram of a system in which the motors are included in multiple-arc branches of the main circuit. Fig. 2 is a diagram showing motors run in series in the line.

G is any generator of alternating currents, and A A the conductors of the main line. B B are parallel branches between these conductors. In each of such branches is a series motor, of which E represents the armature and F the field-circuit. In series with each motor is a condenser C of a value to neutralize the self-induction of the motor, so that when the latter is at rest no opposition is offered to the passage of the current but ohmic resistance.

R is a variable resistance in series with each motor for adjusting the current on the start.

In Fig. 2 the arrangement is based on the same principle. The motors, however, are in this case connected in series, and around each is a shunt S, containing a rheostat or variable resistance. These shunts may be comptetely interrupted when the motor is running. In series with each motor in this arrangement, as in the other, is a condenser capable of neutralizing the self-induction of the motor. We have found it practicable by this means to operate any form of commutating-motor by an alternating current.

We do not claim the principle of neutralizing self-induction by means of condensers; nor do we claim the plan, broadly, of neutralizing the self-induction of motors by means of condensers; but What we regard as our invention is—

1. The combination, with a generator of alternating currents and a motor, both of the elements of which are energized by the directly-impressed electro-motive force of the generator, of a condenser in series with such motor and adapted to neutralize its self-induction, as herein set forth.

2. The combination, with a generator of alternating currents and a series-wound motor or motors connected therewith, of a condenser in series with each motor and of a capacity or value capable of neutralizing the self-induction of the motor with which it is associated.

3. The combination, with a generator of alternating currents and one or more series-wound motors connected therewith, of a condenser in series with each motor and of a capacity or value capable of neutralizing the self-induction of the same, and a variable resistance associated with each motor, adapted to regulate the amount of current passing through said motor, as set forth.

JOHN F. KELLY.
WILLIAM STANLEY, JR.

Witnesses:
T. E. THEBERATH,
JOSEPH J. KELLY,
ARTHUR S. PROUT,
JOHN F. VAN DEUSEN.